(12) United States Patent
Ishikawa

(10) Patent No.: US 12,479,003 B2
(45) Date of Patent: Nov. 25, 2025

(54) MASKING MEMBER, AND METHOD FOR COATING HOLLOW MEMBER

(71) Applicant: SANOH INDUSTRIAL CO., LTD., Tokyo (JP)

(72) Inventor: Tetsuya Ishikawa, Ibaraki (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 87 days.

(21) Appl. No.: 18/288,101

(22) PCT Filed: Apr. 22, 2022

(86) PCT No.: PCT/JP2022/018590
§ 371 (c)(1),
(2) Date: Oct. 24, 2023

(87) PCT Pub. No.: WO2022/230775
PCT Pub. Date: Nov. 3, 2022

(65) Prior Publication Data
US 2024/0198379 A1    Jun. 20, 2024

(30) Foreign Application Priority Data

Apr. 30, 2021    (JP) ................................. 2021-077977

(51) Int. Cl.
*B05B 12/26*    (2018.01)
*B05C 21/00*    (2006.01)
(Continued)

(52) U.S. Cl.
CPC .............. *B05C 21/005* (2013.01); *B05D 1/18* (2013.01); *B05D 1/32* (2013.01); *B05D 3/0413* (2013.01)

(58) Field of Classification Search
CPC ........ B05D 12/26; B05D 12/20; B65D 59/00; B65D 59/06
See application file for complete search history.

(56) References Cited

U.S. PATENT DOCUMENTS 5,613,615 A * 3/1997 Zeyfang ............. B65D 51/1661
220/366.1
5,902,642 A * 5/1999 Horiki ..................... B05B 12/20
118/504
(Continued)

FOREIGN PATENT DOCUMENTS

JP    50-54606 U    5/1975
JP    57-48351 A    3/1982
(Continued)

OTHER PUBLICATIONS

Japanese Office Action for Application No. 2021-077977, dated Sep. 17, 2024.
(Continued)

*Primary Examiner* — Cachet I Proctor
(74) *Attorney, Agent, or Firm* — MARSHALL, GERSTEIN & BORUN LLP

(57) ABSTRACT

A masking member includes: a masking main body that is formed of an elastic material and that closes an opening portion of a hollow member by being inserted into the opening portion; and a passage portion that is formed at the masking main body, that opens on an outer peripheral surface of the masking main body, and that connects an outside and an inside of the hollow member by at least a part of an opening at the outer peripheral surface being exposed to the outside of the hollow member in a case in which the masking main body, in a state of closing the opening portion, moves in a direction opposite from an insertion direction.

11 Claims, 15 Drawing Sheets

(51) Int. Cl.
*B05D 1/18* (2006.01)
*B05D 1/32* (2006.01)
*B05D 3/04* (2006.01)

(56) References Cited

U.S. PATENT DOCUMENTS

2011/0008557 A1* 1/2011 Zeyfang .............. F16L 55/1141
428/36.8
2016/0345440 A1* 11/2016 Kasagani ................ H01L 21/56
2017/0333934 A1* 11/2017 Le Do ................... F16H 57/032

FOREIGN PATENT DOCUMENTS

| JP | S59-073370 U | | 5/1984 |
|---|---|---|---|
| JP | 01148366 A | * | 6/1989 |
| JP | H01-148366 A | | 6/1989 |
| JP | 9-164352 A | | 6/1997 |
| JP | 2000-160386 A | | 6/2000 |
| JP | 2004-358418 A | | 12/2004 |
| JP | 2006-334580 A | | 12/2006 |
| JP | 6861452 B1 | | 4/2021 |

OTHER PUBLICATIONS

International Search Report and Written Opinion for Application No. PCT/JP2022/018590, dated Jun. 21, 2022.

\* cited by examiner

MASKING MEMBER, AND METHOD FOR COATING HOLLOW MEMBER

TECHNICAL FIELD

The present disclosure relates to a masking member and a method for coating a hollow member.

BACKGROUND ART

A coating method is known in which a tubular member is immersed in paint in a state where a opening portion of the tubular member is closed with a masking member.

Japanese Utility Model Laid-Open (JP-U) No. S59-73370 discloses a masking member that closes a opening portion of a pipe in an electrodeposition coating step. The masking member has a function of a one-way valve in order to release a pressure in the pipe to the outside of the pipe at the time of baking and drying in the electrodeposition coating step.

SUMMARY OF INVENTION

Technical Problem

Meanwhile, in the masking member disclosed in JP-U No. S59-73370, a valve structure is applied to the masking main body in order to release the pressure of air expanding in the pipe to the outside of the pipe when the paint is baked and dried. Therefore, the structure of the masking member is complicated.

An object of the present disclosure is to suppress an increase in pressure in a hollow member during heating and drying of a coating material with a simple structure in a masking member that closes a opening portion of the hollow member in a step of coating the hollow member.

Solution to Problem

A masking member according to one aspect of the present disclosure includes: a masking main body that is formed of an elastic material and that closes an opening portion of a hollow member by being inserted into the opening portion; and a passage portion that is formed at the masking main body, that opens on an outer peripheral surface of the masking main body, and that connects an outside and an inside of the hollow member by at least a part of an opening at the outer peripheral surface being exposed to the outside of the hollow member in a case in which the masking main body, in a state of closing the opening portion, moves in a direction opposite from an insertion direction.

Advantageous Effects of Invention

As described above, according to the present disclosure, in the masking member that closes the opening portion of the hollow member in a step of coating the hollow member, it is possible to suppress an increase in pressure in the hollow member during heating and drying of the coating material with a simple structure.

DESCRIPTION OF EMBODIMENTS

Hereinafter, a masking member and a method for coating a hollow member according to an embodiment of the present disclosure will be described with reference to the drawings.

Figure 1:
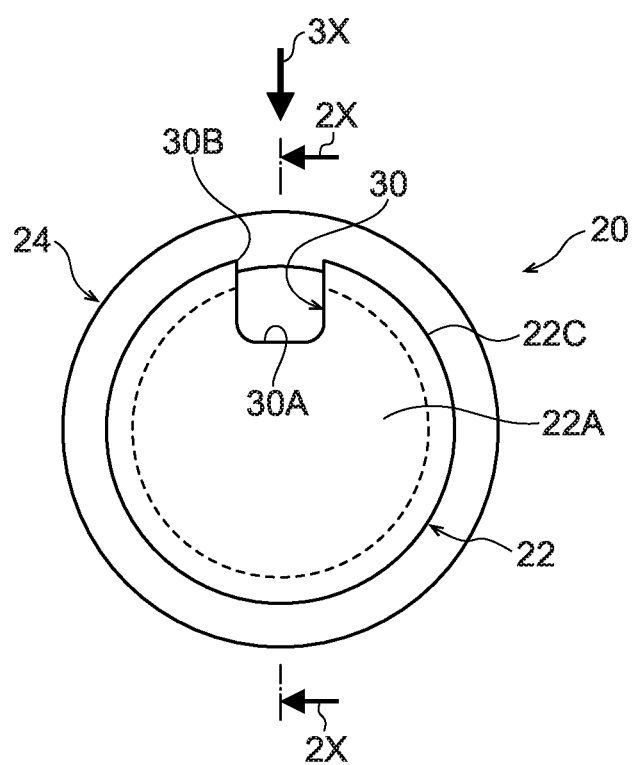
FIG. 1 is a front view of a masking member according to an embodiment of the present disclosure.
Figure 2:
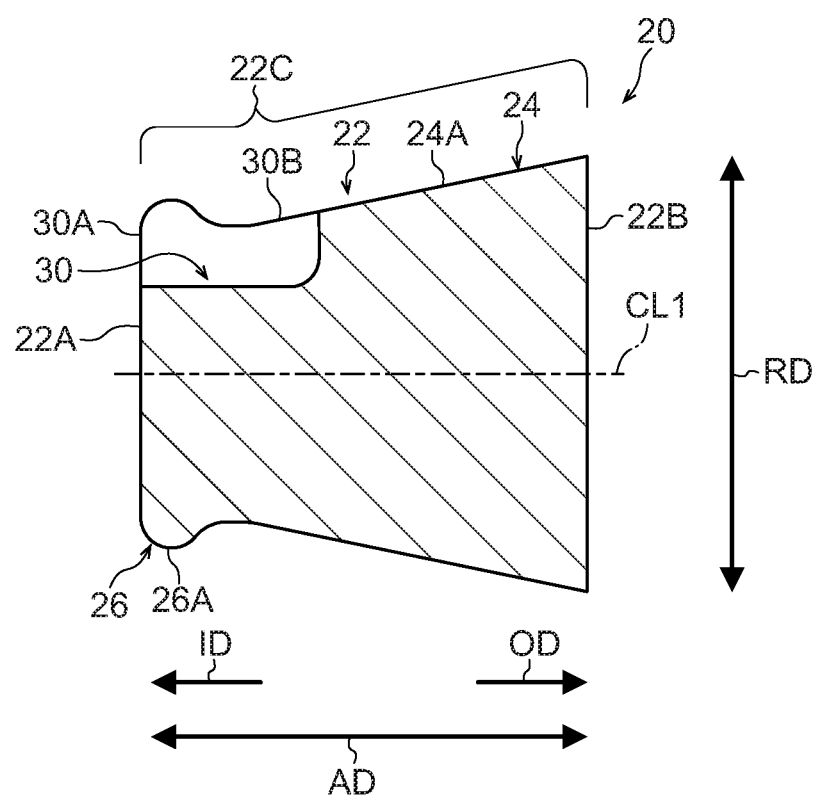
FIG. 2 is a cross-sectional view of the masking member of FIG. 1 taken along line 2X-2X.
Figure 3:
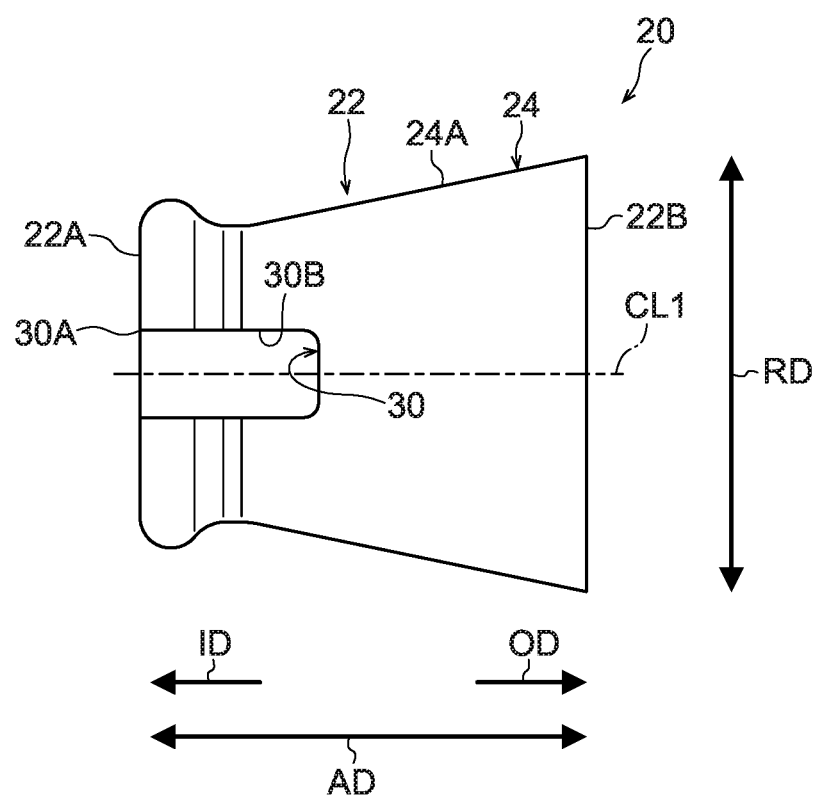
FIG. 3 is a side view of the masking member of FIG. 1 as viewed from a direction of arrow 3X.

FIGS. 1 to 3 illustrate a masking member 20 of the present embodiment. The masking member 20 of the present embodiment is a member that closes an opening portion 52 of a hollow member 50 illustrated in FIG. 4. The masking member 20 is used, for example, in a coating step of the hollow member 50.

First, the hollow member 50 will be described, and then the masking member 20 will be described in detail.

(Hollow Member 50)

Figure 4:
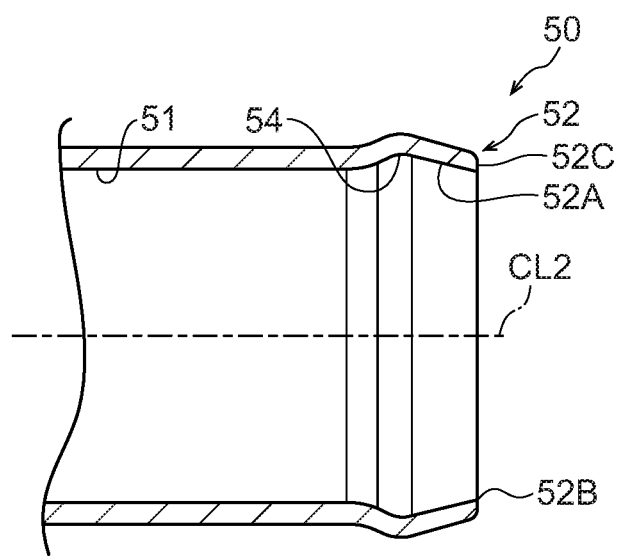
FIG. 4 is a cross-sectional view along an axial direction of a hollow member in which the masking member of FIG. 1 is used.

As illustrated in FIG. 4, the hollow member 50 includes a hollow portion 51 and the opening portion 52 connected to the hollow portion 51. The hollow member 50 of the present embodiment is, for example, a linear tubular member (for example, a straight pipe). Therefore, an inside of the hollow member 50 corresponds to the hollow portion 51, and an axial end portion of the hollow member 50 corresponds to the opening portion 52. Note that, in FIG. 4, a center line of the hollow member 50 is indicated by reference sign CL2.

In the present embodiment, the hollow member 50 is a linear tubular member, but the present disclosure is not limited to this configuration. For example, the hollow member 50 may be a tubular member that is curved (bent in an L shape as an example) or a tubular member that branches into a plurality of parts (branched in a T shape as an example).

Furthermore, as illustrated in FIG. 4, the opening portion 52 of the hollow member 50 is subjected to terminal processing. Note that the terminal processing here refers to, for example, bulge processing, spool processing, and the like. By this terminal processing, an annular recess 54 extending along a circumferential direction of the hollow member 50 is formed at an inner peripheral surface of the opening portion 52 of the hollow member 50.

Furthermore, the hollow member 50 of the present embodiment is formed of a metal material.

(Masking Member 20)

Next, the masking member 20 will be described in detail. As illustrated in FIGS. 1 to 3, 5, and 6, the masking member 20 includes a masking main body 22 and a passage portion 30.

Figure 6:
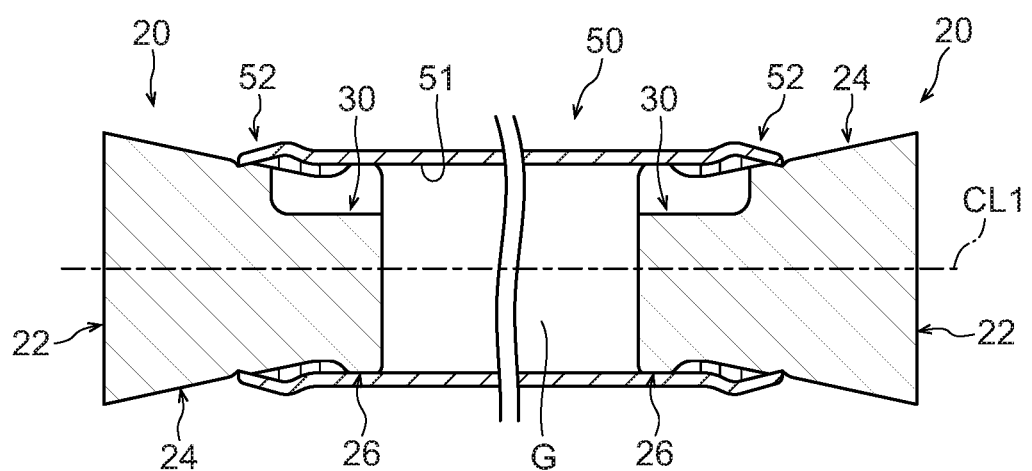
FIG. 6 is a cross-sectional view along the axial direction of the masking member illustrating a state in which the masking member of FIG. 1 is inserted into opening portions on both sides of the hollow member.

As illustrated in FIGS. 1 and 2, the masking main body 22 constitutes a body of the masking member 20. The masking main body 22 is made of an elastic material and has a substantially columnar shape. As illustrated in FIG. 6, by inserting the masking main body 22 into the opening portion 52 of the hollow member 50, in other words, by pushing the masking main body into the opening portion 52, the opening portion 52 is closed.

Figure 5:
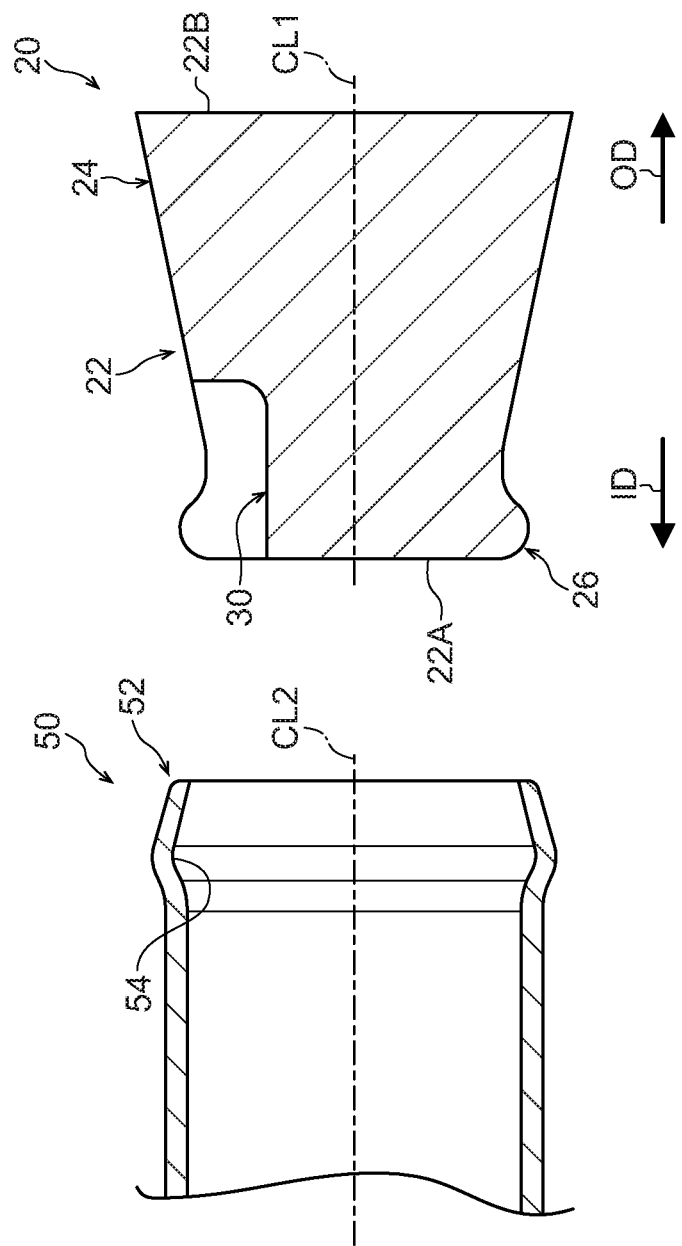
FIG. 5 is a cross-sectional view of the masking member taken along the axial direction illustrating a state before the masking member of FIG. 1 is inserted into an opening portion of the hollow member.

In FIGS. 2, 3, and 5, a center line of the masking main body 22 is indicated by reference sign CL1, and an axial direction of the masking main body 22, which is a direction along the center line CL1, is indicated by arrow AD. Furthermore, in FIGS. 2, 3, and 5, in the axial direction of the masking main body 22, a direction in which the masking main body 22 is inserted into the hollow member 50 is indicated by arrow ID, and a direction opposite from the insertion direction of the masking main body 22 is indicated by arrow OD. Note that, as illustrated in FIGS. 6, 7, 9, and 10, a center line CL2 of the hollow member 50 is not illustrated in a state in which the masking main body 22 is inserted into the opening portion 52 of the hollow member 50.

As the elastic material constituting the masking main body 22, an elastic material having excellent heat resistance is preferably used. For example, it is preferable to use an elastic material that can withstand temperatures of 200° ° C. or higher (In other words, a change in physical property value is small even at 200° ° C. or higher.). Examples thereof include silicon rubber.

As illustrated in FIGS. 2, 3, and 5, the masking main body 22 includes a distal end surface 22A that is one end surface in the axial direction, a pressing surface 22B that is the other end surface (in other words, an end surface located on an opposite side to the distal end surface 22A in the axial direction) in the axial direction, and an outer peripheral surface 22C. Here, the distal end surface 22A is an end surface in the insertion direction of the masking main body 22, and the pressing surface 22B is an end surface in a direction opposite from the insertion direction of the masking main body 22. Note that the pressing surface 22B is a portion that presses the masking main body in a case in which the masking main body 22 is pushed into the opening portion 52.

Furthermore, as illustrated in FIGS. 2, 3, and 5, the masking main body 22 includes an enlarged diameter portion 24 having an outer diameter that gradually increases in the direction opposite from the insertion direction. In other words, the masking main body 22 includes the enlarged diameter portion 24 having an outer diameter that gradually increases toward the pressing surface 22B that is the other end surface in the axial direction. Specifically, the enlarged diameter portion 24 is formed from an intermediate portion in the axial direction of the masking main body 22 to the pressing surface 22B. Note that an outer peripheral surface 24A of the enlarged diameter portion 24 is included in the outer peripheral surface 22C of the masking main body 22.

Figure 8:
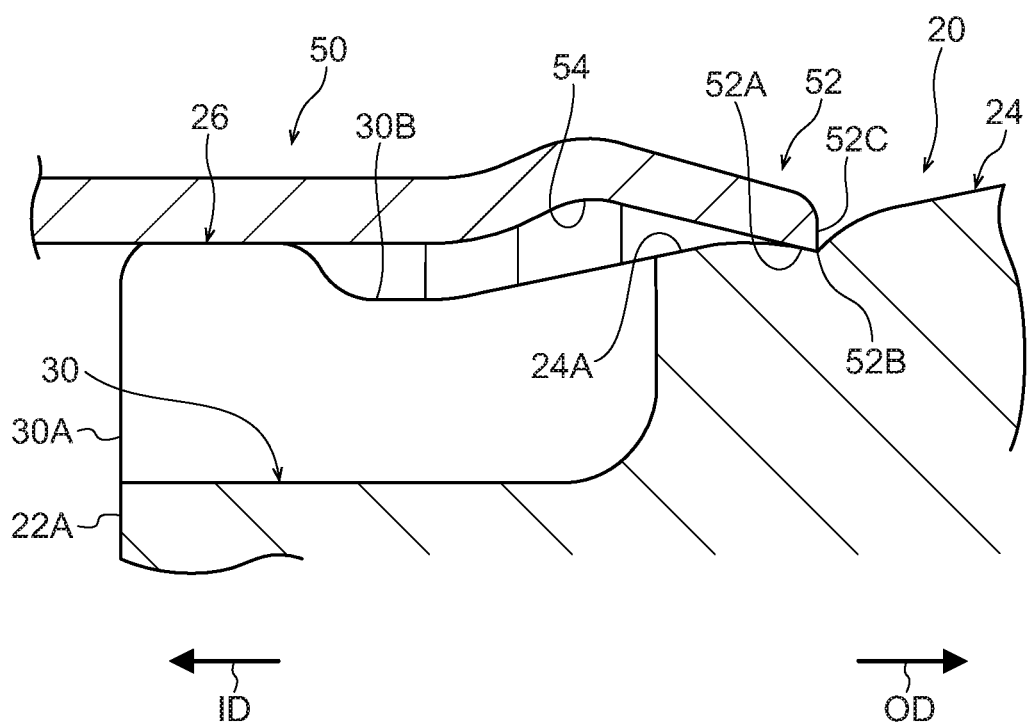
FIG. 8 is an enlarged view of a portion indicated by an arrow 8X in FIG. 7.

The outer diameter of the enlarged diameter portion 24 is larger than an opening diameter of the opening portion 52 at least at a terminal end (end on a side of the pressing surface 22B) of the outer peripheral surface 24A. In the present embodiment, for example, the outer diameter of the enlarged diameter portion 24 is larger than the opening diameter of the opening portion 52 on a starting end (end on a side of the distal end surface 22A) side of the outer peripheral surface 24A. Therefore, as illustrated in FIGS. 6 and 8, when the masking main body 22 closes the opening portion 52, the outer peripheral surface 24A of the enlarged diameter portion 24 comes into contact with an inner peripheral surface 52A of the opening portion 52. Specifically, the outer peripheral surface 24A of the enlarged diameter portion 24 comes into contact with an inner edge portion 52B of the opening portion 52 and the inner peripheral surface 52A around the inner edge portion 52B.

Furthermore, as illustrated in FIGS. 1 to 3 and 6, the masking main body 22 includes a restriction portion 26 that overhangs radially outward from a side of the distal end surface 22A in the insertion direction. The restriction portion 26 is formed at a substantially annular shape. Furthermore, the cross-sectional shape of an outer end portion 26A on a radially outer side of the restriction portion 26 is an arc shape protruding outward in a radial direction. Note that, in FIGS. 2 and 3, the radial direction of the masking main body 22 is indicated by arrow RD. Furthermore, the outer end portion 26A is sized to be fitted into the recess 54 of the opening portion 52.

Figure 9:
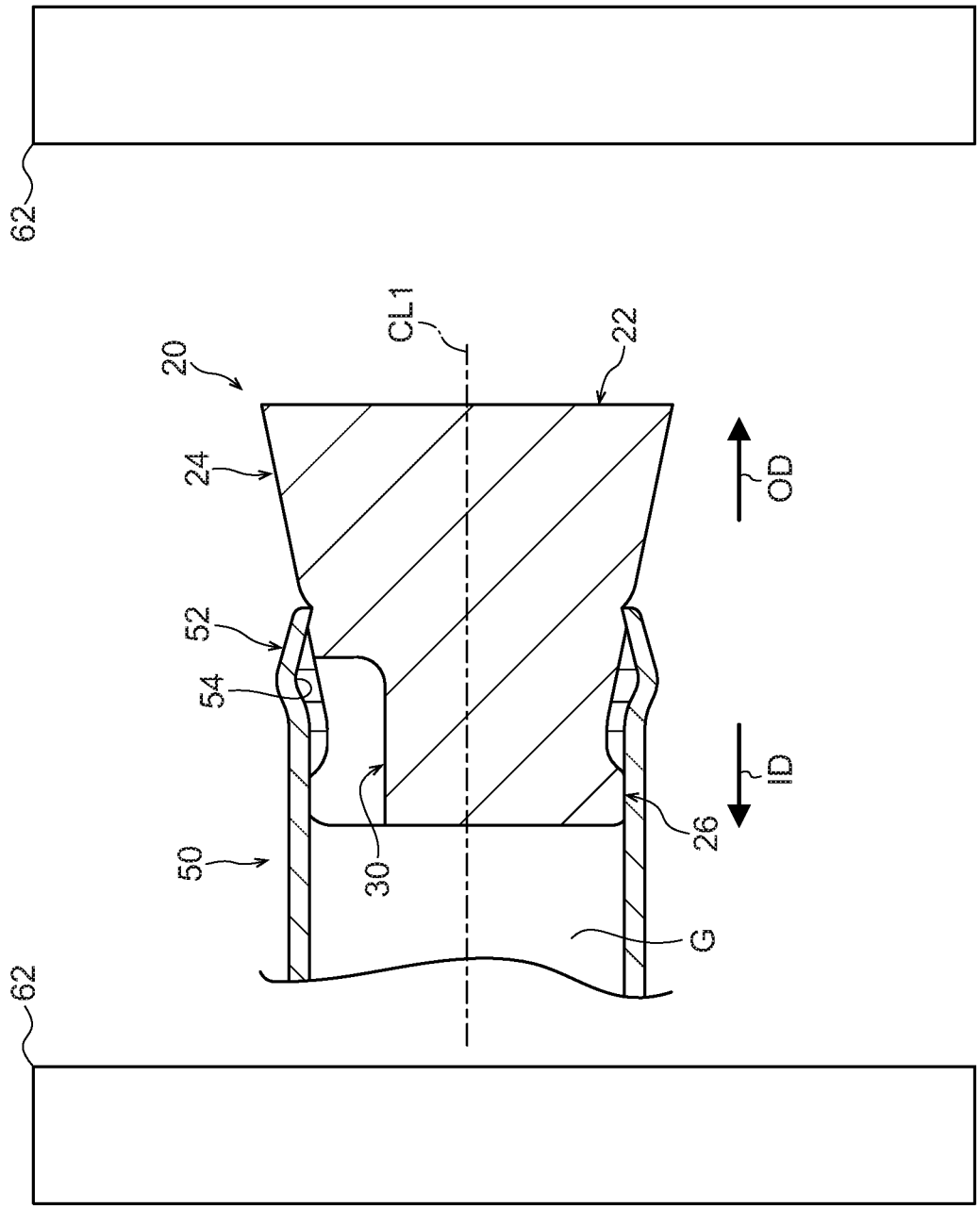
FIG. 9 is a cross-sectional view along the axial direction of the masking member illustrating a state in which the hollow member of FIG. 7 is conveyed to a heating dryer.

As illustrated in FIG. 5, an outer diameter (maximum outer diameter) of the restriction portion 26 is larger than the opening diameter of the opening portion 52 and larger than the inner diameter of the hollow member 50. Therefore, as illustrated in FIGS. 6 and 8, when the masking main body 22 closes the opening portion 52, the outer end portion 26A of the restriction portion 26 comes into contact with the inner peripheral surface of the hollow member 50. As illustrated in FIG. 9, the outer end portion 26A of the restriction portion 26 is fitted into the recess 54 to restrict movement of the masking main body 22 in the direction opposite from the insertion direction.

As illustrated in FIGS. 1 to 3, the passage portion 30 is formed at the masking main body 22. The passage portion 30 opens to the distal end surface 22A of the masking main body 22 and opens to the outer peripheral surface 22C of the masking main body 22. Hereinafter, an opening at the distal end surface 22A of the passage portion 30 is denoted by reference sign 30A, and an opening at the outer peripheral surface 22C of the passage portion 30 is denoted by reference sign 30B. Furthermore, the passage portion 30 according to the present embodiment is a groove formed at the outer peripheral surface 22C of the masking main body 22. Specifically, the passage portion 30 is a groove that extends from the distal end surface 22A toward the pressing surface 22B along the axial direction of the masking main body 22 and terminates halfway. A starting end of the groove corresponds to the opening 30A of the passage portion 30, and an upper opening at the groove (in other words, an opening located on a side opposite to a bottom of the groove) corresponds to the opening 30B of the passage portion 30.

Figure 7:
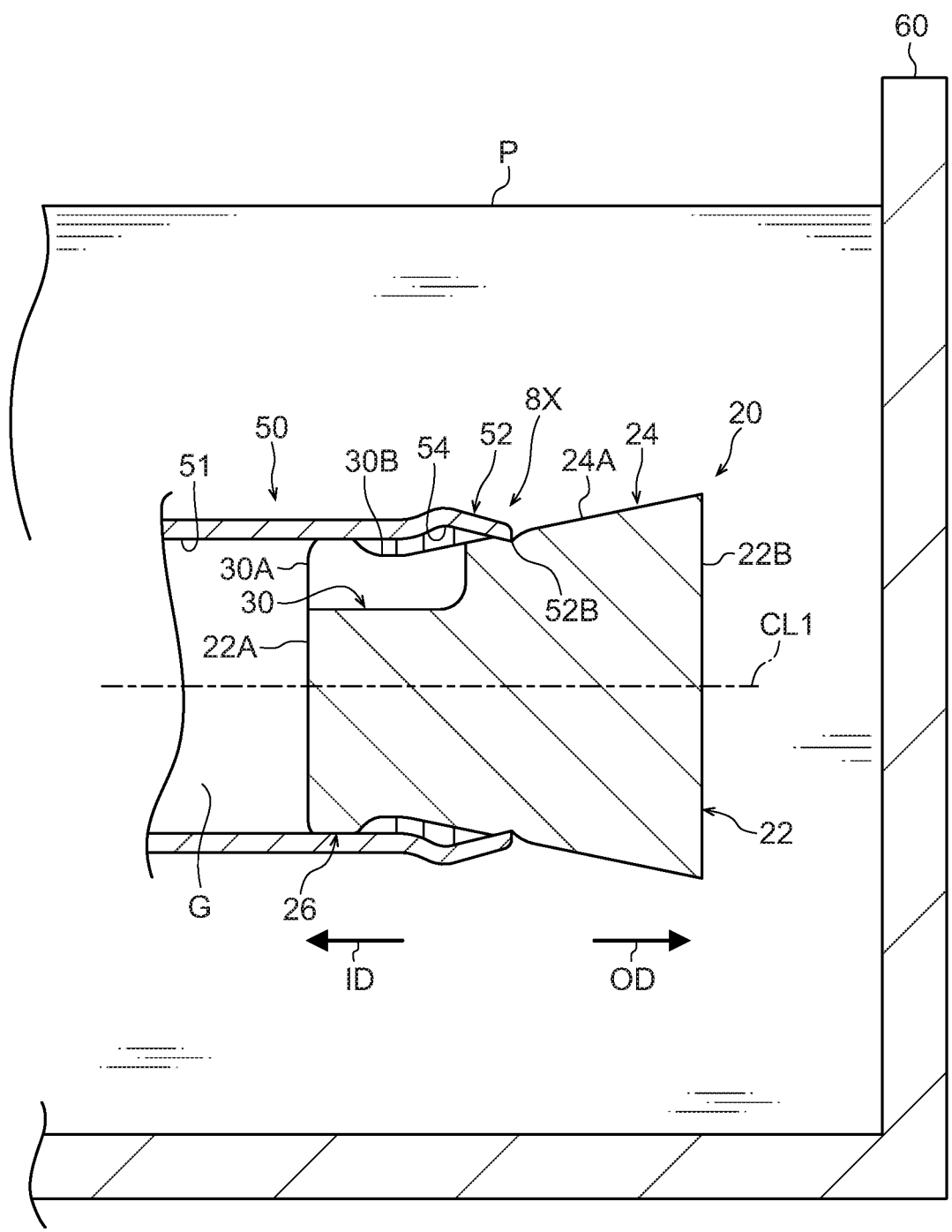
FIG. 7 is a cross-sectional view along the axial direction of the masking member illustrating a state in which the hollow member of FIG. 6 is immersed in a coating material.
Figure 10:
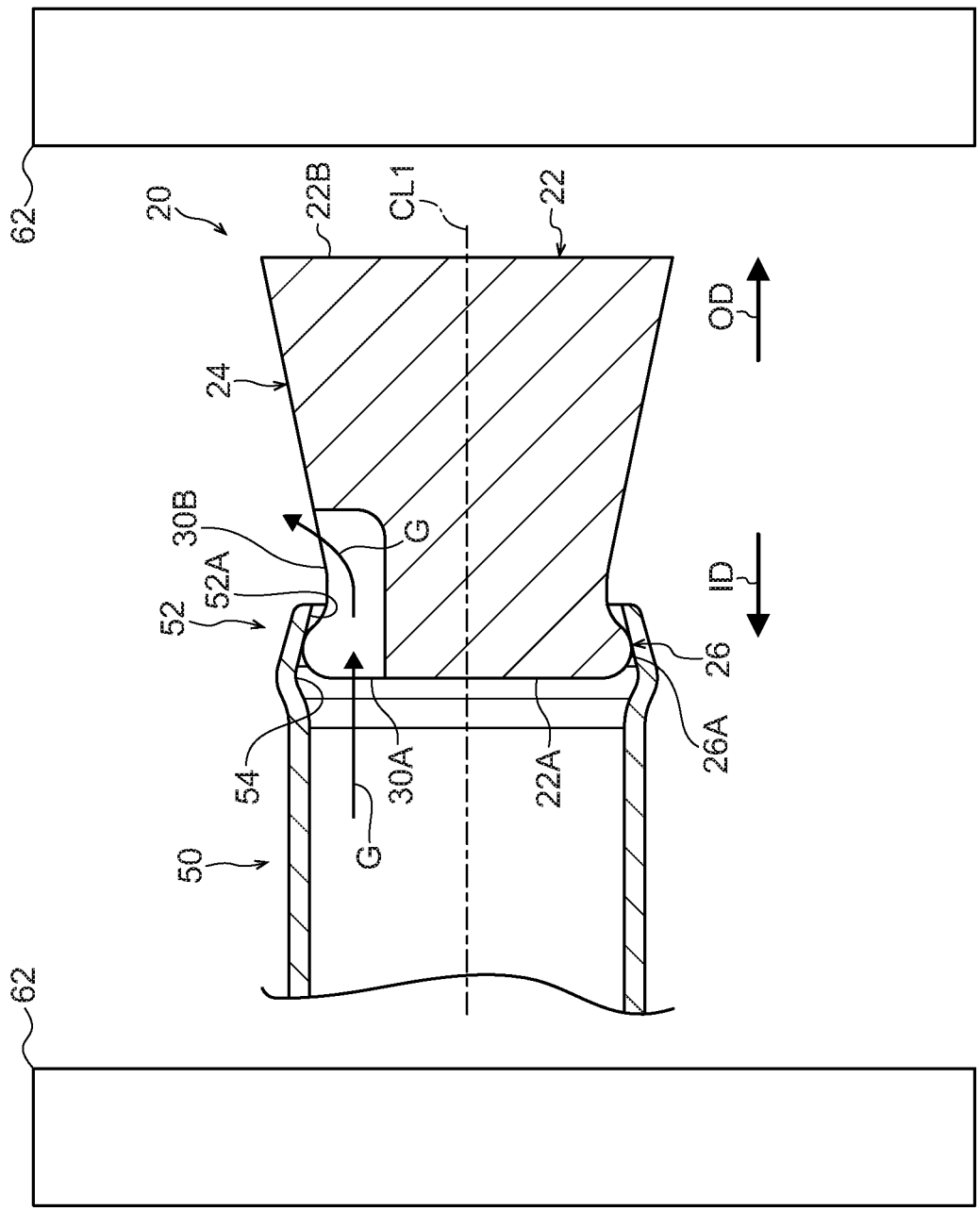
FIG. 10 is a cross-sectional view along the axial direction of the masking member illustrating a state in which the masking member of FIG. 9 is moved in a direction opposite from an insertion direction by heating and drying the hollow member.

Furthermore, as illustrated in FIG. 2, the passage portion 30 extends toward a side of the pressing surface 22B from a start end of the enlarged diameter portion 24 of the masking main body 22. Specifically, as illustrated in FIG. 7, the passage portion 30 terminates at a position closer to a side of the distal end surface 22A than a contact portion between the outer peripheral surface 22C of the masking main body 22 and the inner peripheral surface 52A of the opening portion 52 in a state in which the opening portion 52 is closed by the masking main body 22. Thus, the passage portion 30 is disposed in the opening portion 52 and shielded from the outside of the hollow member 50 in the state where the opening portion 52 is closed by the masking main body 22. Furthermore, as illustrated in FIG. 10, the opening 30B of the passage portion 30 is exposed to the outside of the hollow member 50 by movement of the masking main body 22 in the direction opposite from the insertion direction. When the opening 30B of the passage portion 30 is exposed to the outside of the hollow member 50, the inside and the outside of the hollow member 50 are connected via the passage portion 30.

Next, a method for coating the hollow member 50 of the present embodiment will be described.

Note that examples of a method for coating the hollow member 50 include electrodeposition coating, electrostatic coating, and dip coating.

First, the hollow member 50 including the hollow portion 51 and the opening portion 52 connected to the hollow portion 51 is prepared, and as illustrated in FIG. 6, the masking main body 22 of the masking member 20 is inserted into the opening portion 52 of the hollow member 50 to close the opening portion 52.

Next, the hollow member 50 is conveyed to a tank 60 filled with a coating material P. Then, as illustrated in FIG. 7, the hollow member 50 is immersed in the coating material in a state in which the opening portion 52 of the hollow member 50 is closed by the masking main body 22.

Next, as illustrated in FIG. 9, the hollow member 50 is conveyed from the tank 60 to a heating dryer 62. Then, hot air is blown from the heating dryer 62 toward the hollow member 50 to heat and dry the coating material P that adheres to the hollow member 50.

After the coating material P is dried, the masking member 20 is removed from the hollow member 50. As a result, the coating step of the hollow member 50 is completed.

Next, functions and effects of the masking member 20 and the method of coating the hollow member 50 of the present embodiment will be described.

In the masking member 20 of the present embodiment, the masking main body 22 can close the opening portion 52 of the hollow member 50. As illustrated in FIG. 7, in a case where the hollow member 50 is immersed in the coating material P in a state in which the opening portion 52 of the hollow member 50 is closed by the masking main body 22, the entry of the coating material P into the opening portion 52 is prevented by the masking main body 22. Furthermore, in a case where the coating material P adhering to the hollow member 50 is heated and dried, a gas G (air as an example) in the hollow member 50 thermally expands, and the pressure in the hollow member 50 increases. When the masking main body 22 is pushed and moved in the direction opposite from the insertion direction by this pressure increase (see FIG. 10), the opening 30B of the passage portion 30 is exposed to the outside of the hollow member 50. That is, the outside and the inside of the hollow member 50 are connected via the passage portion 30. Since the gas G in the hollow member 50 flows out to the outside of the hollow member 50 through the passage portion 30, for example, it is possible to suppress an increase in pressure in the hollow member 50 as compared with a configuration in which the passage portion 30 is not formed at the masking main body 22. As a result, dropping of the masking main body 22 from the hollow member 50 due to strong pushing of the masking main body 22 out of the hollow member 50 by the increase in pressure in the hollow member 50 is suppressed.

Here, for example, as compared with a masking member to which a valve structure is applied, the masking member 20 has a simple structure in which the masking main body 22 is formed with the passage portion 30 that is open to the distal end surface 22A of the masking main body 22 and open to the outer peripheral surface 22C, and it is possible to suppress an increase in pressure accompanying thermal expansion of the gas G in the hollow member 50 during heating and drying of the coating material P.

Furthermore, in the masking member 20, the passage portion 30 is open to the outer peripheral surface 22C of the masking main body 22 and is open to the distal end surface 22A of the masking main body 22. As a result, in the masking member 20, for example, as compared with a configuration in which an inlet and an outlet of the passage portion are formed at the outer peripheral surface of the masking main body, in a case where the masking main body 22 moves in the direction opposite from the insertion direction to expose the opening 30B, which is an outlet of the gas, to the outside of the hollow member 50, the inside and the outside of the hollow member 50 can be reliably connected via the passage portion 30.

Furthermore, in the masking member 20, the passage portion 30 is a groove formed at the outer peripheral surface 22C of the masking main body 22, so that the passage portion 30 can be easily molded with respect to the masking main body 22 as compared with, for example, a configuration in which the passage portion 30 is a hole formed at the masking main body 22.

Furthermore, in the masking member 20, by inserting the masking main body 22 into the opening portion 52 of the hollow member 50, the outer peripheral surface 24A of the enlarged diameter portion 24 comes into contact with the inner peripheral surface 52A of the opening portion 52. In this state, in a case where the hollow member 50 is immersed in the coating material P, the coating material is prevented from entering the inside of the opening portion 52 beyond the contact portion between the outer peripheral surface 24A of the enlarged diameter portion 24 and the inner peripheral surface 52A of the opening portion 52. On the other hand, the coating material P can enter the contact portion between the outer peripheral surface 24A of the enlarged diameter portion 24 and the inner peripheral surface 52A of the opening portion 52 in the hollow member 50, and adheres from the outer periphery of the hollow member 50 to the end surface 52C of the opening portion 52 by entering the contact portion. Therefore, in the step of coating the hollow member 50, the end surface 52C of the opening portion 52 of the hollow member 50 can be coated by using the masking member 20. In other words, the hollow member 50 coated up to the end surface 52C of the opening portion 52 can be manufactured. In the hollow member 50 coated in this way, a coated boundary (a boundary between a coated surface and an uncoated surface) is not formed at the outer surface, so that the appearance is improved.

Moreover, in the masking member 20, in a case where the coating material P adhering to the hollow member 50 is heated and dried, as illustrated in FIG. 10, even if the masking main body 22 is pushed and moved in the direction opposite from the insertion direction, the outer end portion 26A of the restriction portion 26 is fitted into the recess 54, so that movement of the masking main body 22 in the direction opposite from the insertion direction is restricted. Thus, in the masking member 20, for example, as compared with a configuration in which the masking main body 22 does not include the restriction portion 26, the masking main body 22 is pushed out vigorously from inside the hollow member 50 due to the pressure increase in the hollow member 50, whereby the masking main body 22 is prevented from falling off the hollow member 50.

Furthermore, in the method for coating the hollow member 50, the masking main body 22 of the masking member 20 is inserted into the opening portion 52 of the hollow member 50 to close the opening portion 52 of the hollow member 50. Therefore, in a case where the hollow member 50 is immersed in the coating material P, it is possible to prevent the coating material P from entering the opening portion 52. Furthermore, in a case where the coating material P that adheres to the hollow member 50 is heated and dried, the gas G in the hollow member 50 is thermally expanded, and the pressure in the hollow member 50 increases. When the masking main body 22 is pushed and moved in the direction opposite from the insertion direction by this pressure increase, the opening 30B of the passage portion 30 is exposed to the outside of the hollow member 50. As a result, the outside and the inside of the hollow member 50 are connected via the passage portion 30. Since the gas G in the hollow member 50 flows out to the outside of the hollow member 50 through the passage portion 30, for example, it is possible to suppress an increase in pressure in the hollow member 50 as compared with a configuration in which the passage portion 30 is not formed at the masking main body 22. As a result, dropping of the masking main body 22 from the hollow member 50 due to strong pushing of the masking main body 22 out of the hollow member 50 by the increase in pressure in the hollow member 50 is suppressed. As a result, it is possible to reduce time and effort to stop a coating line of the hollow member 50 and collect the dropped masking member 20.

Moreover, in the method for coating the hollow member 50, for example, as compared with the case of using the masking member to which the valve structure is applied, the masking member 20 having a simple structure can suppress the pressure increase accompanying the thermal expansion of the gas G in the hollow member 50 during the heating and drying of the coating material P.

In the masking member 20, in a case where the masking main body 22 is made of silicone rubber, the masking main body 22 can be reused as the uncoated hollow member 50 by removing the masking main body 22 from the hollow member 50.

Furthermore, in the masking member 20, a portion opposite to the insertion direction of the masking main body 22 is formed by the outer peripheral surface 24A of the enlarged diameter portion 24 and the pressing surface 22B. For this reason, the coating material adhering to the masking member 20 after being used in the coating step of the hollow member 50 can be easily peeled off. In other words, since the coating material P adheres only to the flat outer peripheral surface 24A and the flat pressing surface 22B of the masking main body 22, for example, the peeling work is easily performed as compared with the case where the coating material P adheres to a complicated shape portion.

Furthermore, the masking member 20 can close the opening portion 52 by pushing the masking main body 22 into the opening portion 52 of the hollow member 50. Therefore, the masking member 20 has a simple structure and good attachment workability to the opening portion 52 as compared with, for example, a configuration in which a male screw of the masking main body is screwed into a female screw of the opening portion of the hollow member.

Figure 11:
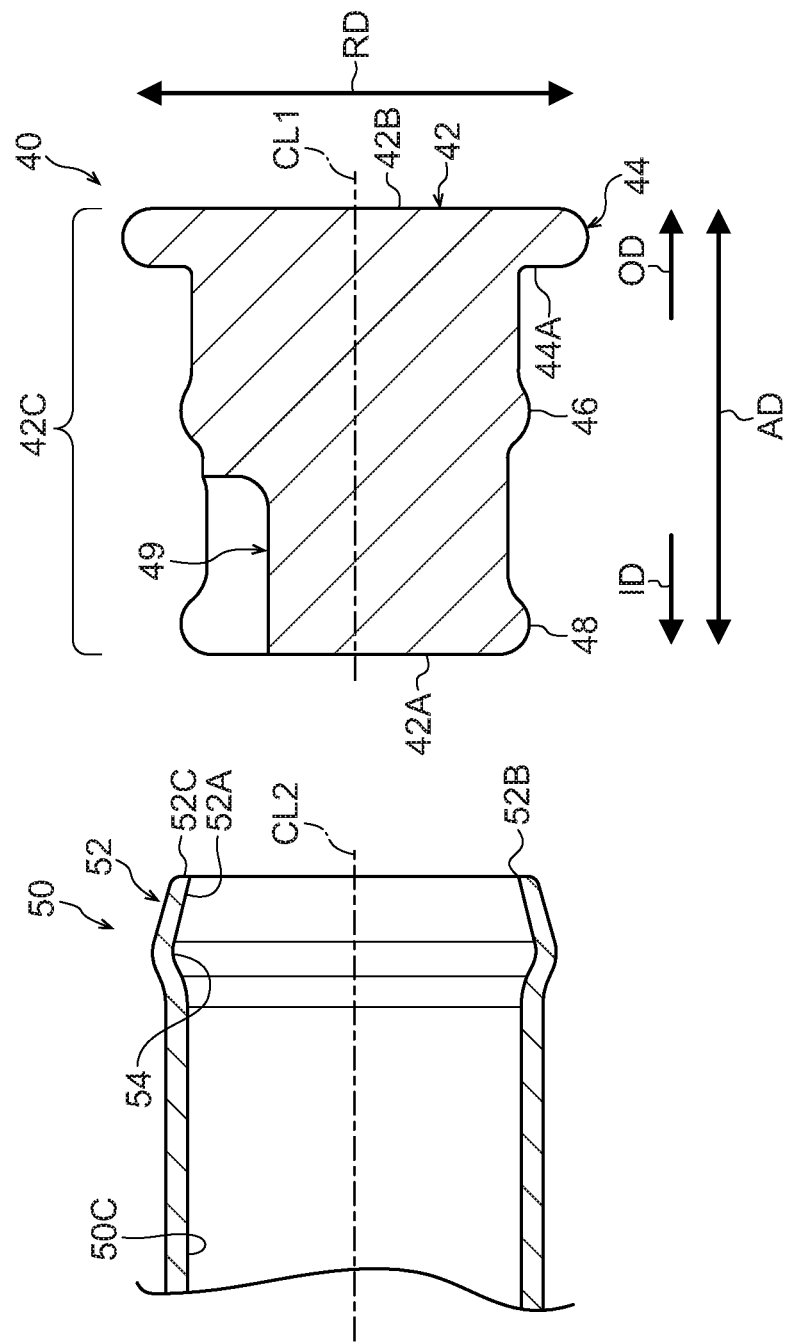
FIG. 11 is a cross-sectional view of a masking member according to another embodiment of the present disclosure taken along an axial direction, illustrating a state before the masking member is inserted into an opening portion of a hollow member.
Figure 12:
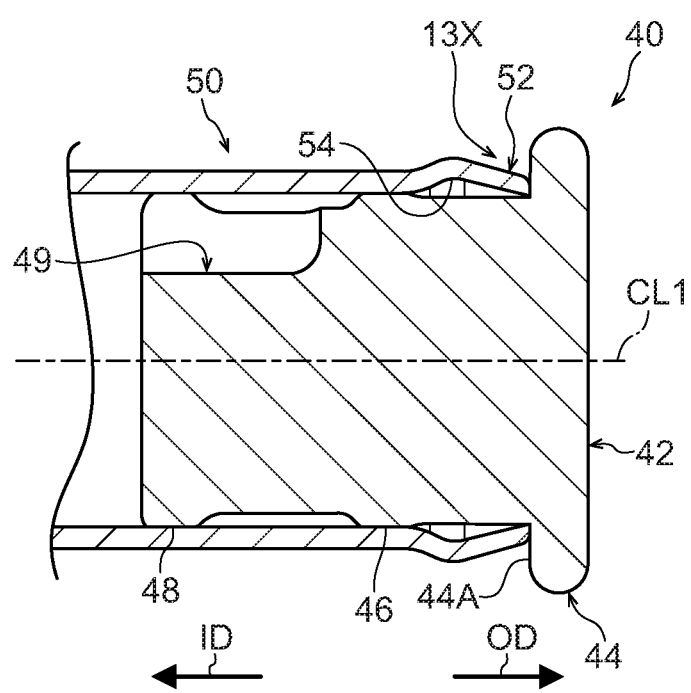
FIG. 12 is a cross-sectional view along the axial direction of the masking member illustrating a state in which the masking member of FIG. 11 is inserted into the opening portion of the hollow member.
Figure 13:
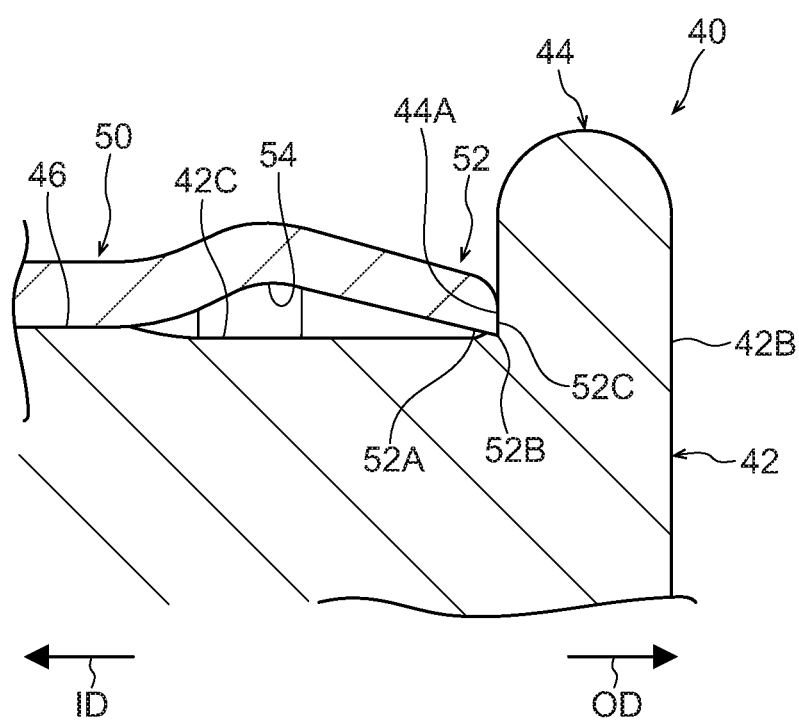
FIG. 13 is an enlarged view of a portion indicated by arrow 13X in FIG. 12.

In the masking member 20 of the above-described embodiment, the masking main body 22 includes the enlarged diameter portion 24, but the present disclosure is not limited to this configuration. For example, as in a masking member 40 illustrated in FIGS. 11 and 12, a masking main body 42 may include a first overhanging portion 44 and a second overhanging portion 46. Similarly to the masking main body 22, the masking main body 42 is formed of an elastic material in a substantially columnar shape. The masking main body 42 includes a distal end surface 42A, a pressing surface 42B, and an outer peripheral surface 42C. Furthermore, the masking main body 42 includes a restriction portion 48 and a passage portion 49. Here, since configurations of the restriction portion 48 and the passage portion 49 of the masking main body 42 are the same as configurations of the restriction portion 26 and the passage portion 30 of the masking main body 22, the description thereof is omitted. Furthermore, as illustrated in FIGS. 11 and 12, the first overhanging portion 44 that overhangs radially outward from an end portion side in a direction opposite from an insertion direction of the masking main body 42. To be more specific, the first overhanging portion 44 overhangs in an annular shape outward in a radial direction from an end portion of the masking main body 42 on a side of the pressing surface 42B in an axial direction. Furthermore, an outer diameter of the first overhanging portion 44 is larger than an opening diameter of the opening portion 52 of the hollow member 50. Therefore, in a state in which the masking main body 42 closes the opening portion 52, a surface 44A (in other words, a surface of the first overhanging portion 44 on a side of the distal end surface 42A) of the first overhanging portion 44 in the insertion direction faces the end surface 52C of the opening portion 52 (see FIGS. 12 and 13). Furthermore, the second overhanging portion 46 overhangs in an annular shape radially outward from a portion of the masking main body 42 between the first overhanging portion 44 and the passage portion 49. An outer diameter of the second overhanging portion 46 is larger than the inner diameter of the hollow member 50. In the masking member 40, since the passage portion 49 is formed at the masking main body 42, a function and an effect similar to those of the masking member 20 of the above-described embodiment can be obtained. However, the functions and effects obtained by the enlarged diameter portion 24 are excluded. Furthermore, in the masking member 40, in a case where the masking main body 42 is inserted into the opening portion 52, the masking main body 42 is inserted into the opening portion 52 until the surface 44A of first overhanging portion 44 comes into contact with the end surface 52C of the opening portion 52, whereby the masking main body 42 reliably closes the opening portion 52. That is, in the masking member 40, since a distance between the surface 44A of the first overhanging portion 44 and the end surface 52C of the opening portion 52 is a guide of an insertion amount of the masking main body 42 into the opening portion 52, for example, the work of closing the opening portion 52 with the masking main body 42 can be reliably and easily performed as compared with a configuration in which there is no guide of the insertion amount of the masking main body 42.

Figure 14:
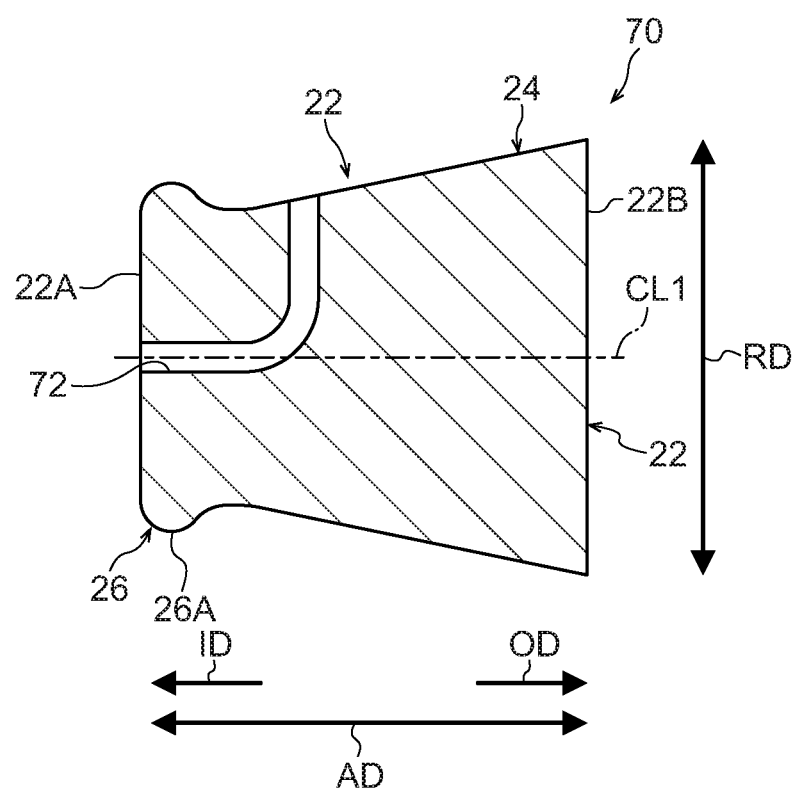
FIG. 14 is a cross-sectional view along an axial direction of a masking member according to another embodiment of the present disclosure.

In the masking member 20 of the above-described embodiment, the passage portion 30 is a groove formed at the outer peripheral surface 22C of the masking main body 22, but the present disclosure is not limited to this configuration. For example, as in a masking member 70 illustrated in FIG. 14, a passage portion 72 may be a hole formed at the masking main body 22. The passage portion 72 extends from the distal end surface 22A toward the outer peripheral surface 22C of the masking main body 22 and opens. As an example, the passage portion 72 extends along an axial direction from the distal end surface 22A of the masking main body 22 toward the pressing surface 22B, bends halfway, extends radially outward, and is opened to the outer peripheral surface 22C. In the masking member 70, since the passage portion 72 is formed at the masking main body 22, a function and an effect similar to those of the masking member 20 of the above-described embodiment can be obtained. However, the functions and effects obtained by the passage portion 30 being a groove are excluded. Note that the configuration in which the passage portion is a hole may be applied to the masking member 40.

Figure 15:
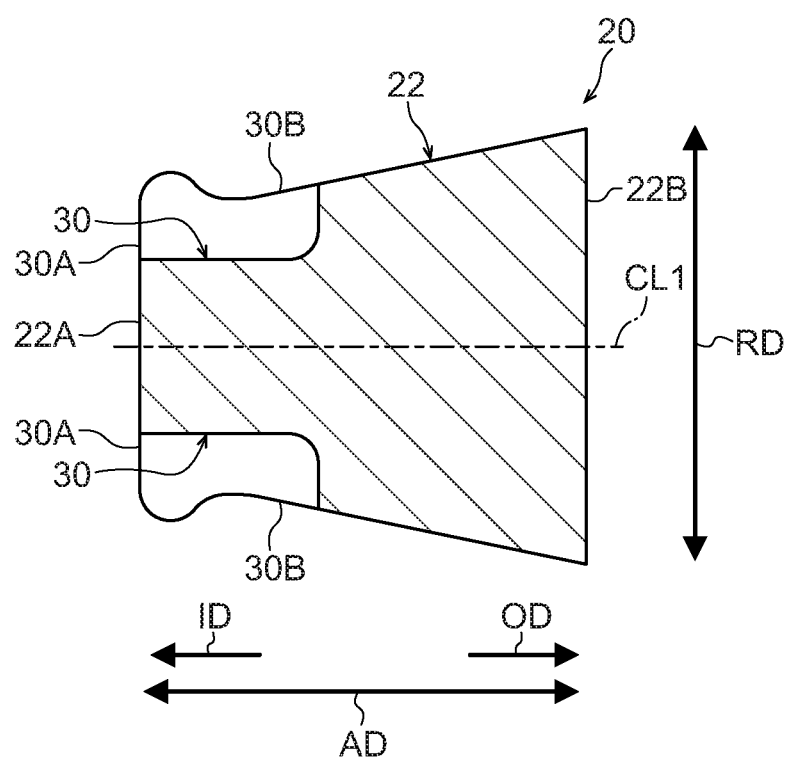
FIG. 15 is a cross-sectional view along an axial direction of a masking member according to another embodiment of the present disclosure.

In the masking member 20 of the embodiment described above, as illustrated in FIG. 1, one passage portion 30 is formed at the masking main body 22, but the present disclosure is not limited to this configuration. For example, a plurality of the passage portions 30 may be formed at the masking main body 22. As an example, in FIG. 15, a pair of passage portions 30 is formed at the masking main body 22 at positions opposite to each other in a radial direction. Note that the configuration in which the plurality of passage portions are formed at the masking main body may be applied to the masking member 40.

In the masking member 20 of the foregoing embodiment, as illustrated in FIG. 6, the masking main body 22 is inserted into the terminal processed opening portion 52 of the hollow member 50, but the present disclosure is not limited to this configuration. For example, the masking main body 22 may be inserted into an unterminated opening portion of the hollow member. Note that the configuration in which the masking main body is inserted into the opening portion of the hollow member, which is not subjected to terminal processing, may be applied to the masking member 40.

In the masking member 20 of the above-described embodiment, the passage portion 30 is a groove that opens to the distal end surface 22A of the masking main body 22 and opens to the outer peripheral surface 22C. However, the present disclosure is not limited to this configuration. For example, the passage portion 30 may be a groove-shaped recess that is open to the outer peripheral surface 22C and not open to the distal end surface 22A of the masking main body 22. Also in this configuration, similarly to the masking member 20 of the above-described embodiment, when the masking main body 22 is pushed and moved in the direction opposite from the insertion direction, a part of the opening at the passage portion is exposed to the outside of the hollow member 50, and the outside and the inside of the hollow member 50 are connected via the passage portion 30. Therefore, even in a case where the passage portion is the groove-shaped recess, similarly to the masking member 20 of the above-described embodiment, it is possible to suppress the pressure increase accompanying the thermal expansion of the gas G in the hollow member 50 during the heating and drying of the coating material P with a simple structure.

In the masking member 20 of the above embodiment, the masking main body 22 includes the restriction portion 26, but the present disclosure is not limited to this configuration. The masking main body 22 may not include the restriction portion 26. Note that the configuration in which the masking main body does not include the restriction portion may be applied to the masking member 40.

Although the embodiments of the present disclosure have been described above with reference to the embodiments, these embodiments are merely examples, and various modifications can be made without departing from the scope of the present disclosure. Furthermore, it goes without saying that the scope of rights of the present disclosure is not limited to these embodiments.

With regard to the above embodiments, the following supplementary notes are further disclosed.

(Supplementary Note 1)

A masking member including:
 a masking main body that is formed of an elastic material and that closes an opening portion of a hollow member by being inserted into the opening portion; and
 a passage portion that is formed at the masking main body, that opens on an outer peripheral surface of the masking main body, and that connects an outside and an inside of the hollow member by at least a part of an opening at the outer peripheral surface being exposed to the outside of the hollow member in a case in which the masking main body, in a state of closing the opening portion, moves in a direction opposite from an insertion direction.

In the masking member of Supplementary Note 1, the opening portion of the hollow member can be closed with the masking main body. In a case where the hollow member is immersed in a coating material in a state in which the opening portion of the hollow member is closed by the masking main body, entry of the coating material into the opening portion is prevented by the masking main body. Furthermore, in a case where the coating material that adheres to the hollow member is heated and dried, a gas in the hollow member is thermally expanded, and a pressure in the hollow member increases. When the masking main body is pushed and moved in the direction opposite from the insertion direction by this pressure increase, the opening formed at the outer peripheral surface of the masking main body, the opening being a part of the passage portion, is exposed to the outside of the hollow member. That is, the outside and the inside of the hollow member are connected via the passage portion. Then, since the gas in the hollow member flows out to the outside of the hollow member through the passage portion, for example, an increase in pressure in the hollow member can be suppressed as compared with a configuration in which the passage portion is not formed at the masking main body. As a result, the masking main body is prevented from falling off from the hollow member by being vigorously pushed out from inside the hollow member with force due to the increase in pressure in the hollow member.

Here, in the masking member of Supplementary Note 1, for example, as compared with a masking member to which a valve structure is applied, with a simple structure in which the passage portion opened to the outer peripheral surface of the masking main body is formed at the masking main body, it is possible to suppress an increase in pressure accompanying thermal expansion of the gas in the hollow member during heating and drying of the coating material.

(Supplementary Note 2)

The masking member according to Supplementary Note 1, in which the passage portion is open to the outer peripheral surface of the masking main body and is open to a distal end surface of the masking main body in the insertion direction.

In the masking member of Supplementary Note 2, the passage portion opens on the outer peripheral surface of the masking main body and opens on the distal end surface of the masking main body in the insertion direction. As a result, in the masking member, for example, as compared with a configuration in which an inlet and an outlet of the passage portion are formed at the outer peripheral surface of the masking main body, the inside and the outside of the hollow member can be reliably connected via the passage portion in a case where the opening on the outer peripheral surface serving as an outlet is exposed to the outside of the hollow member by the movement of the masking main body in the direction opposite from the insertion direction.

(Supplementary Note 3)

The masking member according to Supplementary Note 1 or 2, in which the passage portion is a groove formed at the outer peripheral surface of the masking main body.

In the masking member of Supplementary Note 3, since the passage portion is the groove formed at the outer peripheral surface of the masking main body, for example, the passage portion is easily molded with respect to the masking main body as compared with a configuration in which the passage portion is a hole formed at the masking main body.

(Supplementary Note 4)

The masking member according to any one of Supplementary Notes 1 to 3, in which
   the masking main body includes an enlarged diameter portion having an outer diameter that gradually increases in the direction opposite from the insertion direction, and
   an outer peripheral surface of the enlarged diameter portion is in contact with an inner peripheral surface of the opening portion in a state in which the masking main body closes the opening portion.

In the masking member of Supplementary Note 4, the outer peripheral surface of the enlarged diameter portion comes into contact with the inner peripheral surface of the opening portion by inserting the masking main body into the opening portion of the hollow member. In this state, in a case where the hollow member is immersed in the coating material, the coating material is prevented from entering the inside of the opening portion beyond a contact portion between the outer peripheral surface of the enlarged diameter portion and the inner peripheral surface of the opening portion. On the other hand, the coating material can enter the contact portion between the outer peripheral surface of the enlarged diameter portion and the inner peripheral surface of the opening portion in the hollow member, and adheres from an outer periphery to an opening portion end surface of the hollow member by entering the contact portion. Therefore, in a step of coating the hollow member, by using the masking member, it is possible to coat up to the opening portion end surface of the hollow member. In other words, the hollow member coated up to the opening portion end surface can be manufactured.

(Supplementary Note 5)

The masking member according to any one of Supplementary Notes 1 to 3, in which
   the masking main body includes an overhanging portion that overhangs radially outward from an end portion side in the direction opposite from the insertion direction, and
   a surface of the overhanging portion in the insertion direction faces an end surface of the opening portion in a state in which the masking main body closes the opening portion.

In the masking member of Supplementary Note 5, the surface of the overhanging portion in the insertion direction faces the end surface of the opening portion in a state in which the masking main body closes the opening portion. Here, for example, in a case where the masking main body is inserted into the opening portion of the hollow member, the masking main body reliably closes the opening portion by inserting the masking main body into the opening portion until the surface of the overhanging portion in the insertion direction comes into contact with the end surface of the opening portion. That is, in the mask member, a distance between the surface of the overhanging portion in the insertion direction and the end surface of the opening portion serves as a guide of an insertion amount of the masking main body into the opening portion, and thus, for example, as compared with a configuration in which there is no guide of the insertion amount of the masking main body, the work of closing the opening portion of the hollow member with the masking main body can be reliably and easily performed.

(Supplementary Note 6)

The masking member according to any one of Supplementary Notes 1 to 5, in which
   an annular recess extending along a circumferential direction is formed at an inner peripheral surface of the opening portion in the hollow member, and
   the masking main body includes a restriction portion that overhangs radially outward from a distal end surface side in the insertion direction and is fitted into the recess to restrict movement of the masking main body in the direction opposite from the insertion direction.

In the masking member of Supplementary Note 6, in a case where a coating material that adheres to the hollow member is heated and dried, even if the masking main body is pushed and moved in the direction opposite from the insertion direction, the movement of the masking main body is restricted by the restriction portion of the masking main body being fitted into the recess. As a result, in the masking member, for example, as compared with a configuration in which the masking main body does not include the restriction portion, the masking main body is pushed out vigorously from inside the hollow member due to the pressure increase in the hollow member, so that the masking main body is prevented from falling off from the hollow member.

(Supplementary Note 7)

A method for coating a hollow member, the method including:
   closing an opening portion of the hollow member by inserting the masking main body of the masking member according to any one of Supplementary Notes 1 to 6 into the opening portion;
   immersing the hollow member in a coating material, and heating and drying the coating material that adheres to the hollow member.

In the method for coating a hollow member of Supplementary Note 7, first, the opening portion of the hollow member is closed by inserting the masking main body of the masking member of any one of Supplementary Notes 1 to 6 into the opening portion of the hollow member. Next, the hollow member is immersed in the coating material while the opening portion of the hollow member is closed with the masking main body. Here, entry of the coating material into the opening portion is prevented by the masking main body. Next, the coating material that adheres to the hollow member is heated and dried. During this heating and drying, the gas in the hollow member is thermally expanded, and the pressure in the hollow member increases. When the masking main body is pushed and moved in the direction opposite from the insertion direction by this pressure increase, the opening formed at the outer peripheral surface of the masking main body, the opening being a part of the passage portion, is exposed to the outside of the hollow member. That is, the outside and the inside of the hollow member are connected via the passage portion. Then, since the gas in the hollow member flows out to the outside of the hollow member through the passage portion, for example, an increase in pressure in the hollow member can be suppressed as compared with a configuration in which the passage portion is not formed at the masking main body. As a result, the masking main body is prevented from falling off from the hollow member by being vigorously pushed out from inside the hollow member with force due to the increase in pressure in the hollow member.

Here, in the method for coating a hollow member of Supplementary Note 7, for example, as compared with the case of using the masking member to which the valve structure is applied, the masking member having a simple structure can suppress the pressure increase accompanying the thermal expansion of the gas in the hollow member during the heating and drying of the coating material.

Note that the disclosure of Japanese Patent Application No. 2021-077977 filed on Apr. 30, 2021 is incorporated herein by reference in its entirety.

All documents, patent applications, and technical standards described in this specification are incorporated herein by reference to the same extent as if each individual document, patent application, and technical standard were specifically and individually indicated to be incorporated by reference.

The invention claimed is:

1. A masking member comprising:
   a masking main body that is formed of an elastic material and that closes an opening portion of a hollow member by being inserted into the opening portion; and
   a passage portion that is formed at the masking main body, that opens on an outer peripheral surface of the masking main body, and that connects an outside and an inside of the hollow member by at least a part of an opening at the outer peripheral surface being exposed to the outside of the hollow member in a case in which the masking main body, in a state of closing the opening portion, moves in a direction opposite from an insertion direction, wherein:
   an annular recess extending along a circumferential direction is formed at an inner peripheral surface of the opening portion in the hollow member, and
   the masking main body includes a restriction portion that overhangs radially outward from a distal end surface side in the insertion direction and is fitted into the recess to restrict movement of the masking main body in the direction opposite from the insertion direction.

2. The masking member according to claim 1, wherein the passage portion is open to the outer peripheral surface of the masking main body and is open to a distal end surface of the masking main body in the insertion direction.

3. The masking member according to claim 2, wherein the passage portion is a groove formed at the outer peripheral surface of the masking main body.

4. The masking member according to claim 2, wherein:
   the masking main body includes an enlarged diameter portion having an outer diameter that gradually increases in the direction opposite from the insertion direction, and
   an outer peripheral surface of the enlarged diameter portion is in contact with an inner peripheral surface of the opening portion in a state in which the masking main body closes the opening portion.

5. The masking member according to claim 2, wherein:
   the masking main body includes an overhanging portion that overhangs radially outward from an end portion side in the direction opposite from the insertion direction, and
   a surface of the overhanging portion in the insertion direction faces an end surface of the opening portion in a state in which the masking main body closes the opening portion.

6. The masking member according to claim 1, wherein the passage portion is a groove formed at the outer peripheral surface of the masking main body.

7. The masking member according to claim 6, wherein:
   the masking main body includes an enlarged diameter portion having an outer diameter that gradually increases in the direction opposite from the insertion direction, and
   an outer peripheral surface of the enlarged diameter portion is in contact with an inner peripheral surface of the opening portion in a state in which the masking main body closes the opening portion.

8. The masking member according to claim 6, wherein:
   the masking main body includes an overhanging portion that overhangs radially outward from an end portion side in the direction opposite from the insertion direction, and
   a surface of the overhanging portion in the insertion direction faces an end surface of the opening portion in a state in which the masking main body closes the opening portion.

9. The masking member according to claim 1, wherein:
   the masking main body includes an enlarged diameter portion having an outer diameter that gradually increases in the direction opposite from the insertion direction, and
   an outer peripheral surface of the enlarged diameter portion is in contact with an inner peripheral surface of the opening portion in a state in which the masking main body closes the opening portion.

10. The masking member according to claim 1, wherein:
    the masking main body includes an overhanging portion that overhangs radially outward from an end portion side in the direction opposite from the insertion direction, and
    a surface of the overhanging portion in the insertion direction faces an end surface of the opening portion in a state in which the masking main body closes the opening portion.

11. A method for coating a hollow member, the method comprising:
    closing an opening portion of the hollow member by inserting the masking main body of the masking member according to claim 1 into the opening portion;
    immersing the hollow member in a coating material, and heating and drying the coating material that adheres to the hollow member.

* * * * *